(12) United States Patent
Peters

(10) Patent No.: US 7,864,945 B2
(45) Date of Patent: Jan. 4, 2011

(54) METHOD FOR DETECTING AVAILABILITY OF NON-TRADITIONAL AGENT

(75) Inventor: Michael Peters, Chicago, IL (US)

(73) Assignee: Aspect Software, Inc., Lombard, IL (US)

( * ) Notice: Subject to any disclaimer, the term of this patent is extended or adjusted under 35 U.S.C. 154(b) by 1229 days.

(21) Appl. No.: 10/999,517

(22) Filed: Nov. 30, 2004

(65) Prior Publication Data

US 2006/0115071 A1 Jun. 1, 2006

(51) Int. Cl.
*H04M 3/02* (2006.01)

(52) U.S. Cl. .................. 379/265.03; 370/230; 370/270; 370/271; 370/395.1; 379/265.11; 379/266.01; 379/266.07; 455/412.2; 455/445; 455/456.1; 455/518; 709/203; 709/223

(58) Field of Classification Search . 379/265.01–266.1, 379/266.07; 370/270, 271, 395.1, 230; 455/412.2, 455/445, 456.1, 518; 709/203, 223
See application file for complete search history.

(56) References Cited

U.S. PATENT DOCUMENTS

| | | | |
|---|---|---|---|
| 5,073,890 A * | 12/1991 | Danielsen | 370/270 |
| 5,206,903 A * | 4/1993 | Kohler et al. | 379/265.12 |
| 5,400,327 A * | 3/1995 | Dezonno | 370/271 |
| 5,555,179 A | 9/1996 | Koyama et al. | |
| 5,742,675 A * | 4/1998 | Kilander et al. | 379/266.09 |
| 5,765,033 A | 6/1998 | Miloslavsky | |
| 5,841,854 A * | 11/1998 | Schumacher et al. | 379/265.11 |
| 5,926,539 A | 7/1999 | Shtivelman | |
| 5,933,488 A * | 8/1999 | Marcus et al. | 379/217.01 |
| 5,946,387 A | 8/1999 | Miloslavsky | |
| 5,953,332 A | 9/1999 | Miloslavsky | |
| 5,953,405 A | 9/1999 | Miloslavsky | |
| RE36,416 E | 11/1999 | Szlam et al. | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,088,442 A * | 7/2000 | Chavez et al. | 379/265.03 |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,222,919 B1 | 4/2001 | Hollatz et al. | |

(Continued)

FOREIGN PATENT DOCUMENTS

EP 0 424015 B1 3/1996

(Continued)

*Primary Examiner*—Gerald Gauthier
(74) *Attorney, Agent, or Firm*—Husch Blackwell LLP Welsh Katz

(57) ABSTRACT

A method is provided for distribution and assignment of calls to an agent that has confirmed its current availability status. In one embodiment an agent is selected by the system and prompted for its current availability. If the agent is available, the call is routed to the agent. If the agent is not available the system selects another agent and the process is repeated. Then, a call is assigned to an available agent based on current availability information.

18 Claims, 1 Drawing Sheet

U.S. PATENT DOCUMENTS

| | | | |
|---|---|---|---|
| 6,259,774 B1 | 7/2001 | Miloslavsky | |
| 6,272,347 B1* | 8/2001 | Griffith et al. | 455/445 |
| 6,314,177 B1 | 11/2001 | Davis et al. | |
| 6,320,956 B1 | 11/2001 | Cherry | |
| 6,333,980 B1 | 12/2001 | Hollatz et al. | |
| 6,345,305 B1 | 2/2002 | Beck et al. | |
| 6,366,575 B1 | 4/2002 | Barkan et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,493,446 B1 | 12/2002 | Cherry | |
| 6,493,447 B1 | 12/2002 | Goss et al. | |
| 6,614,783 B1 | 9/2003 | Sonesh et al. | |
| 6,636,733 B1* | 10/2003 | Helferich | 455/412.2 |
| 6,651,085 B1* | 11/2003 | Woods | 709/203 |
| 6,654,815 B1 | 11/2003 | Goss et al. | |
| 6,687,241 B1 | 2/2004 | Goss | |
| 6,724,885 B1 | 4/2004 | Deutsch et al. | |
| 6,732,156 B2 | 5/2004 | Miloslavsky | |
| 6,735,298 B2 | 5/2004 | Neyman et al. | |
| 6,751,310 B1* | 6/2004 | Crossley | 379/266.07 |
| 6,766,009 B2 | 7/2004 | Williams et al. | |
| 6,785,380 B2* | 8/2004 | Ribera | 379/265.09 |
| 6,816,733 B1* | 11/2004 | Dezonno et al. | 455/456.1 |
| 6,934,380 B2* | 8/2005 | Shaffer et al. | 379/265.03 |
| 6,965,669 B2* | 11/2005 | Bickford et al. | 379/265.07 |
| 6,980,821 B2* | 12/2005 | Balasuriya et al. | 455/518 |
| 6,985,943 B2* | 1/2006 | Deryugin et al. | 709/224 |
| 7,023,979 B1* | 4/2006 | Wu et al. | 379/265.11 |
| 7,106,743 B1* | 9/2006 | Kavulak et al. | 370/395.1 |
| 7,110,523 B2* | 9/2006 | Gagle et al. | 379/265.01 |
| 7,366,293 B2* | 4/2008 | Ezerzer et al. | 379/265.1 |
| 7,644,144 B1* | 1/2010 | Horvitz et al. | 709/223 |
| 2001/0046209 A1* | 11/2001 | Glassman | 370/230 |
| 2006/0062373 A1* | 3/2006 | Chervets et al. | 379/265.03 |
| 2006/0115071 A1* | 6/2006 | Peters | 379/265.03 |

FOREIGN PATENT DOCUMENTS

| | | |
|---|---|---|
| EP | 1 125 425 B1 | 1/2004 |
| GB | 2 287 609 A | 9/1995 |
| GB | 2 293 724 A | 4/1996 |
| WO | WO 00/70849 | 11/2000 |
| WO | WO 00/70849 A3 | 11/2000 |
| WO | WO 01/74042 A2 | 10/2001 |
| WO | WO 01/74042 A3 | 10/2001 |

* cited by examiner

METHOD FOR DETECTING AVAILABILITY OF NON-TRADITIONAL AGENT

FIELD OF THE INVENTION

The present invention relates to a method for detecting availability of a non-traditional agent and more particularly to a method that routes calls based on current agent availability information.

BACKGROUND OF THE INVENTION

Systems for detecting availability of agents to receive calls of various types are known in the art. Such systems are typically used in an organizational context as a means of distributing telephone calls among agents of the organization. To improve the consistency and quality of call handling, agents are typically segregated into groups to serve particular call targets of the organization.

Often the organization disseminates a single telephone number to its customers and to the public in general as a means of contacting the organization. As calls are directed to the organization from the telephone network, the automatic call distribution system directs the calls to its agents based upon some algorithm, typically based upon availability. For example, where all agents are considered equal, the automatic call distributor may distribute the calls based upon which agent position or telephone has been idle the longest.

Previous solutions that route transactions or calls based on agent selection are limited in that when the system wants to assign a voice contact to an agent, it is possible that the agent is not currently dialed in to the system. In that case, the system must dial the agent and have that agent answer in order to connect with the caller. The system may assign a call to the agent, only to have the agent receive another non-system related call prior to the system making the actual call. The system can tell that the device has answered, but not whether the answer was provided by the agent or the agent's voice mail system. The problem that arises is that a caller could be sent to an agent's voice mail. For example, the system directs a call to an agent who is waiting to take calls at home, but by chance, a friend calls the agent. The call generated by the system could get answered by the agent's voice mail.

The present invention overcomes these and other problems inherent in existing methods for routing calls to agents. The present invention provides a method for detecting the availability of a non-traditional agent that connects a transaction or caller to an agent only after the agent has confirmed its current availability status.

BRIEF SUMMARY OF THE INVENTION

A method is provided for distribution and assignment of transactions or calls to an agent that has confirmed its current availability status. In one embodiment an agent is selected by the system and prompted for its current availability. If the agent is available, the call is routed to the agent. If the agent is not available the system selects another agent and the process is repeated. A call is assigned to an available agent based on current availability information.

DETAILED DESCRIPTION OF THE INVENTION

Figure 1:
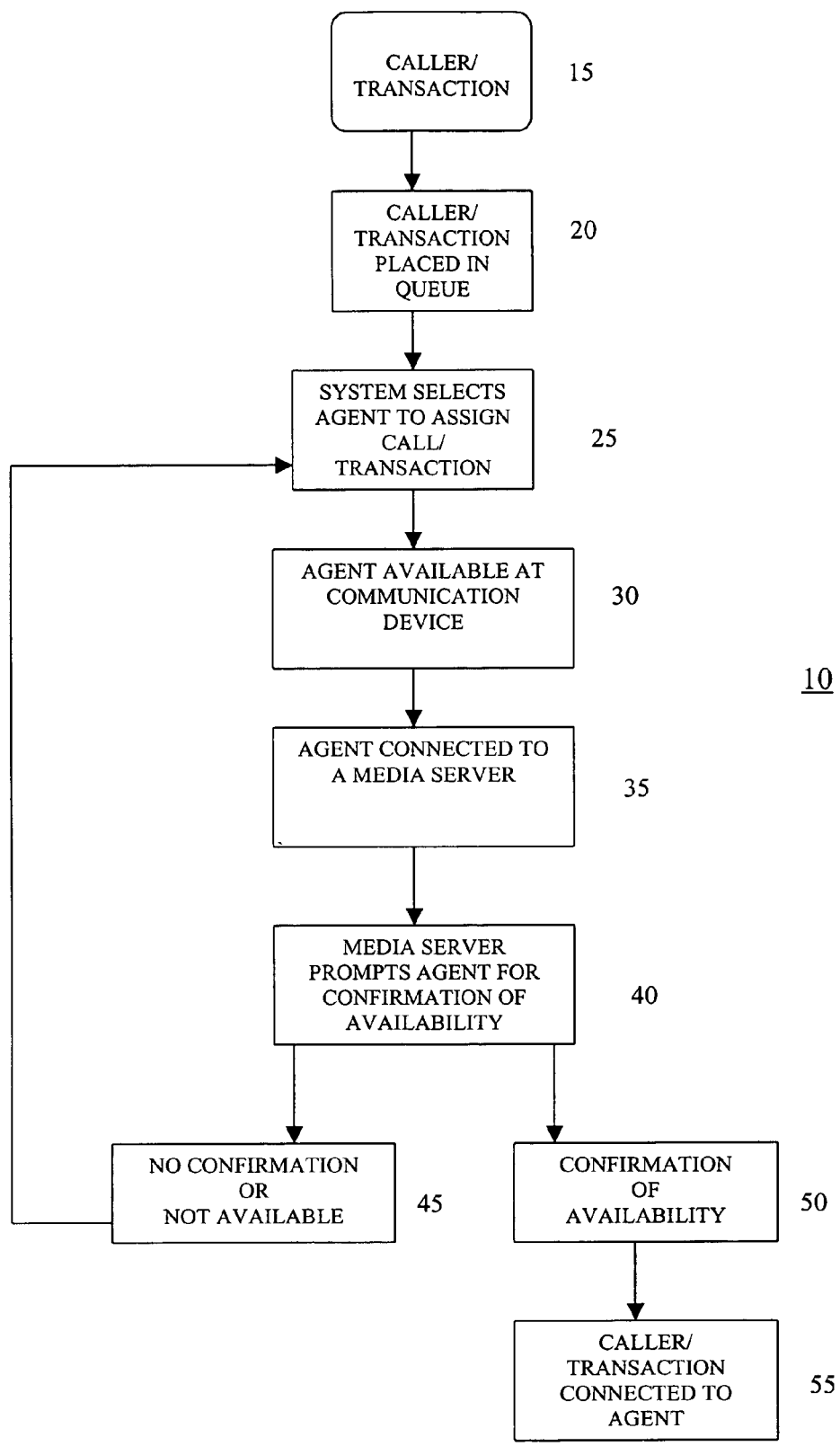
FIG. 1 is a flow chart of one embodiment of a method for detecting availability of a non-traditional agent of the present invention.

While the present invention is susceptible of embodiments in various forms, there is shown in the drawings and will hereinafter be described some exemplary and non-limiting embodiments, with the understanding that the present disclosure is to be considered an exemplification for the invention and is not intended to limit the invention to the specific embodiments illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

FIG. 1 is a flow chart of one embodiment of a method 10 for detecting availability of a non-traditional agent constructed in accordance with the present invention. As shown in FIG. 1, initially, when a caller, block 15, dials the available telephone number, a caller is placed in queue, block 20, waiting for an available agent, block 25. If that agent happens to be present at his/her cell phone, block 30, the system will call the agent and connect them to a media server, block 35, that will prompt them for a confirmation, block 40, that they are available (or not) for a call. If a voice mail system is reached then there will be no confirmation, block 45, and for the purpose of this call, the system will assume the agent is unavailable and find the next available agent, block 25, or possibly retry depending on how the system is programmed. The agent may answer the call but be in a position that makes it difficult for them to accept the call. In this case, the agent may indicate that they are not available for this call, block 45. Finally, should the agent indicate availability, block 50, the system will connect the agent to the caller, block 55.

In an alternate embodiment, agents use specialized hardware or software (such as agent desktops) to indicate their status. This solution allows agents to take calls any place and at any time.

Specific embodiments of novel methods for detecting availability of non-traditional agents according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method for detecting availability of a non-traditional agent in an automatic call distribution (acd) system to receive a call from a caller, said method comprising the steps of:

the acd system selecting a non-traditional agent having a cell phone to be assigned to the call;

determining that the selected agent is present at the cell phone of the selected agent prior to calling the selected agent's cell phone;

the acd system placing an agent call to the agent cell phone of the selected agent and connecting the call to a media server, the media server prompting the agent on the agent cell phone for confirmation of availability when the agent call is connected to the agent phone;

selecting another agent if a voicemail system answers the call;

the acd system connecting the caller to the agent in response to confirmation of availability from the agent, and not connecting the caller if no confirmation is received.

2. The method of claim 1 further comprising the step of agent is available at a communication device.

3. The method of claim 1 further comprising connecting the agent to the media server.

4. The method of claim 3 further comprising the media server prompting the agent for confirmation of availability.

5. The method of claim 1 further comprising receiving a confirmation of non availability from the agent and selecting another agent for confirmation of availability in response thereto.

6. The method of claim 1 further comprising receiving no response from the agent and selecting another agent for confirmation of availability in response thereto.

7. The method of claim 1 further comprising connecting the agent call to an agent's voicemail system and retrying the agent for confirmation of availability in response thereto.

8. The method of claim 1 further comprising connecting the agent call to an agent's voicemail system and selecting another agent for confirmation of availability in response to connecting to the agent's voicemail system.

9. The method of claim 1 further comprising receiving a confirmation of availability from the agent and connecting the caller in response thereto.

10. A method for detecting current availability of a non-traditional agent to receive a call via an automatic call distribution (acd) system comprising the steps of:
   the acd system selecting a non-traditional agent having a cell phone to be assigned to the call;
   determining that the selected agent is present at the cell phone of the selected agent prior to calling the selected agent's cell phone;
   the acd system placing an agent call to the agent cell phone of the selected agent and connecting the call to a media server, the media server prompting the agent on the agent phone for confirmation of current availability when the agent call is answered;
   receiving a response from the agent cell phone and determining availability of the agent in response thereto and;
   the acd system selecting another agent if a voicemail system answers the call.

11. The method of claim 10 further comprising the step of receiving a confirmation of availability from the agent on the agent phone and connecting the call to the agent in response thereto.

12. The method of claim 10 further comprising the step of determining if the agent is available at a communication device.

13. The method of claim 10 further comprising connecting the agent to the media server.

14. The method of claim 13 further comprising the media server prompting the agent for confirmation of availability.

15. The method of claim 10 further comprising receiving a confirmation of non-availability from the agent on the agent phone and selecting another agent for confirmation of availability in response thereto.

16. The method of claim 10 further comprising receiving no response from the agent and selecting another agent for confirmation of availability in response thereto.

17. The method of claim 10 further comprising connecting the agent call to an agent's voicemail system via the agent phone and retrying the agent for confirmation of availability in response thereto.

18. The method of claim 10 further comprising connecting the agent call to an agent's voicemail system and selecting another agent for confirmation of availability in response thereto.

* * * * *